United States Patent [19]

Blytas

[11] 4,230,184
[45] Oct. 28, 1980

[54] SULFUR EXTRACTION METHOD

[75] Inventor: George C. Blytas, Houston, Tex.

[73] Assignee: Shell Oil Company, Houston, Tex.

[21] Appl. No.: 965,659

[22] Filed: Dec. 1, 1978

[51] Int. Cl.² .............. C10G 19/00; C10G 29/08; E21B 21/00
[52] U.S. Cl. ............................. 166/312; 208/230; 208/235; 208/236
[58] Field of Search .............. 208/228, 230, 235, 236; 166/266, 303, 311, 312

[56] References Cited
U.S. PATENT DOCUMENTS

| | | |
|---|---|---|
| 2,020,661 | 11/1935 | Schulze et al. .................. 208/230 |
| 3,393,733 | 7/1968 | Chiang-Hai Kuo et al. ... 166/303 X |
| 3,474,028 | 10/1969 | Bulian et al. .................. 208/230 |
| 3,501,397 | 3/1970 | Thompson et al. .............. 208/236 |
| 3,881,550 | 5/1975 | Barry ............................ 166/266 X |
| 4,018,572 | 4/1977 | Swanson ..................... 208/230 X |

Primary Examiner—Stephen J. Novosad

[57] ABSTRACT

Circulating oil used for removal of sulfur in sour gas wells is contacted with an aqueous solution of a lower polysulfide of an alkali metal or ammonia to form a higher polysulfide of the alkali metal or ammonia, and the oil is separated from the higher polysulfide. The higher polysulfide is converted to lower polysulfide by precipitating part of the sulfur contained therein, and the lower polysulfide is recycled for oil desulfurization.

16 Claims, 4 Drawing Figures

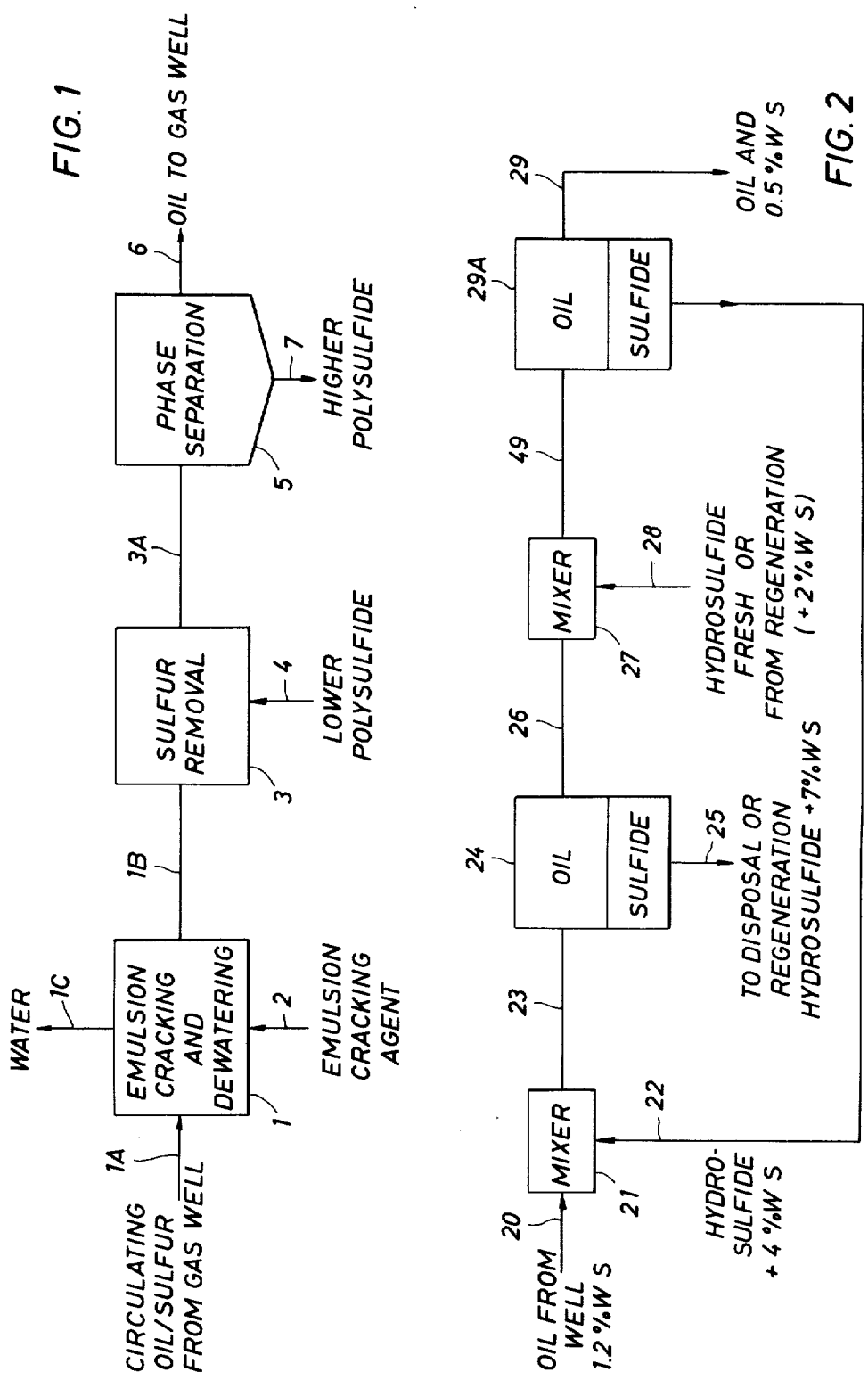

SULFUR EXTRACTION METHOD

Background of the Invention

In deep sour gas wells, oil may be pumped down the annulus between the well casing and the production tubing in order to prevent sulfur deposition, and to carry oil-soluble corrosion inhibitors. Alternatively, oil may be injected into surface gathering lines to prevent sulfur deposition. The oil flows back up through the production tubing along with the produced gasses, is separated from the gasses at the gas plant, and recycled back to the wells (U.S. Pat. No. 3,393,733). As the oil circulates, it absorbs a small amount of elemental sulfur which is produced by the wells. Since the oil is recirculated, there is a continuous increase in sulfur concentration. In order to operate over a long period of time, it is necessary to control the sulfur concentration by removing it from the well as fast as it is added. Use of a sulfide solution of an alkali metal or ammonia to extract sulfur from a mineral oil-sulfur solution is disclosed in U.S. Pat. 3,474,028, and the present invention represents an improvement over the process of this patent.

Summary of the Invention

The primary purpose of this invention resides in extracting sulfur from an oil, particularly a circulating oil used to prevent sulfur deposition in deep sour gas wells.

The above purpose has been achieved by extracting sulfur from circulating oil used to prevent sulfur deposition in deep sour gas wells with aqueous solutions of a lower polysulfide of an alkali metal or ammonia.

More particularly, the present invention provides a process for extracting sulfur from a mineral oil-sulfur solution by mixing said solution with an aqueous solution of a lower polysulfide of an alkali metal or ammonia to form a higher polysulfide of said alkali metal or ammonia, separating the mineral oil from the higher polysulfide, regenerating the lower polysulfide from the higher polysulfide, and recycling the lower polysulfide to be mixed with the oil-sulfur solution.

Alternatively, the present invention provides a process for extracting sulfur from a mineral oil-sulfur solution by countercurrent contacting by mixing the solution with an aqueous solution of a lower polysulfide of an alkali metal or ammonia to form a higher polysulfide of said alkali metal or ammonia, separating the mineral oil from the higher polysulfide, then mixing the mineral oil with a hydrosulfide (either fresh or regenerated from the higher polysulfide) to form a lower polysulfide, and recycling the lower polysulfide to be mixed with the mineral oil-sulfur solution.

Regeneration or production of the lower polysulfide or hydrosulfide from the higher polysulfide may be effected by absorption of $H_2S$ into the higher polysulfide, by distillation of the higher polysulfide with a nitrogen or methane purge, or by recycling part of the higher polysulfide for admixture with fresh alkali or ammonium hydrosulfide.

Within the framework of the above-described method, the present invention not only solves the above-mentioned problems of the prior art, but also achieves further significant advantages as described hereinafter.

Description of the Drawings

FIGS. 1 and 2 schematically depict the sulfur-extraction process of the invention.

Description of Preferred Embodiments

Figure 3:
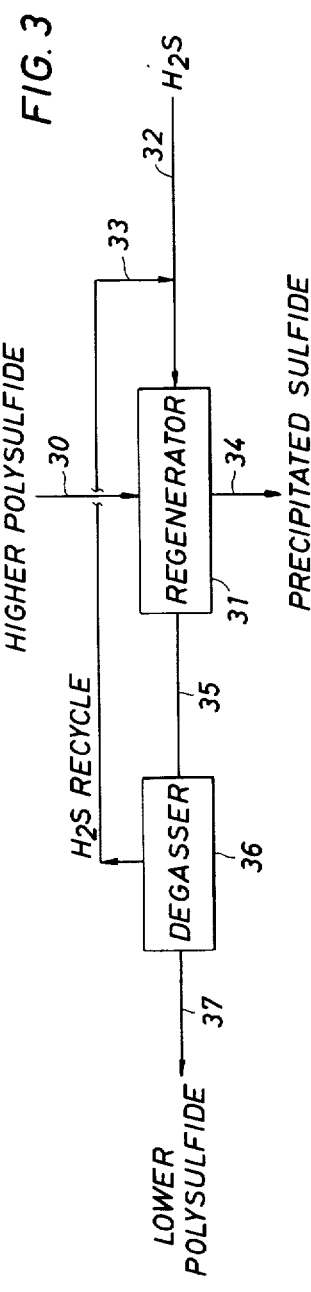
FIGS. 3 and 4 show techniques for regeneration of lower polysulfides.

In accordance with FIG. 1, oil containing sulfur and emulsified water (production water can be up to 30–40% volume of the oil as it comes from a gas well) is taken from a wash tank, storage, a sour gas well, or some other point, and pumped through an emulsion-cracking and dewatering station 1 wherein it is mixed with a cracking agent 2 so that water may be removed, and then through a sulfur removal station 3 wherein it is mixed with an aqueous lower polysulfide stream 4. The oil and aqueous polysulfide phases which are formed separate in a settling station 5 (the cracking agent 2 also serves to separate the aqueous polysulfide), and the oil phase 6 may be washed with water and/or returned to the well, or some other point, through gathering lines, and a higher polysulfide phase 7 is removed for disposal or regeneration.

Stations 1 and 2 may comprise static end line mixing sections which are used to provide turbulent mixing of the oil and emulsion-cracking agent and/or polysulfide. The mixing sections may consist of mixing elements inside pipe sections, pipes packed with Raschig rings or similar packing, or simply pipe sections of varying diameter. Alternatively, mixing may be carried out in tanks or other suitable vessels using a powered stirrer.

The polysulfide and oil phases separate in station 5 with the polysulfide going to the bottom, in the case of an alkali metal sulfide, and to the top in the case of ammonium polysulfide. Station 5 may be a tank sized to allow at least several hours residence time for the oil and an equal volume of the polysulfide phase. Flow into the tank can be through a spreader, near the bottom, flow out can be by gravity.

In yet another variation, contacting of the oil and sulfide phases can be done counter-currently, thus reducing the overall requirement of extractant (polysulfide) and/or increasing the extent of desulfurization. FIG. 2 schematically shows a scheme for countercurrent contacting of the sulfide and oil. Oil stream 20 from a gas well, etc., is sent to a mixing station 21 where a hydrosulfide containing 4.5% by weight sulfur is added in stream 22. Stream 23 from mixer 21 is passed to settler 24. Stream 25 of hydrosulfide and 7% by weight sulfur is sent to disposal or regeneration and stream 26 is passed to mixer 27. Hydrosulfide stream 28 (either fresh or from regeneration) containing 2% by weight sulfur is added to mixer 27. Stream 49 is passed to phase separator 29a from which clean oil stream 29b containing 0.5% sulfur is removed, and stream 22 is passed back to mixer 21.

Circulating oils, suitable for use with the present invention, include residual oil fractions or mixtures thereof, with viscosities which are preferably less than 200 centipoises at 50° C. and less than 20 centipoises at 100° C.

Demulsifiers suitable for use with the invention are soluble in the oil phase, unlike the cracking agents of U.S. Pat. No. 3,393,733 which are soluble in the water phase. This is especially convenient since the agent is recycled to the sour gas well to further aid in emulsion cracking. Some of the agent is destroyed by adverse conditions in the well so that it is necessary to continually add some cracking agent to the circulating oil. However, the bulk of the agent maintains its usefulness. Preferred cracking agents include oil soluble anionic, cationic, neutral surfactants and mixtures thereof. These are obtained by functionalizing polyethers which in turn are formed by telomerization of propylene oxide or ethylene oxide or their derivatives. The functionalization may consist of, but is not limited to, sulfonation and amination.

Suitable operating ranges for the temperatures and compositions of the various streams shown in FIG. 1 are about as follows:

lower polysulfide solutions of elemental sulfur from hydrocarbon phases is based on the formation of higher polysulfides. The actual reaction steps involved in formation of higher polysulfides are complex. However, the overall reactions of an ammonium sulfide based system can be approximately summed up as follows:

| Reaction | Description |
|---|---|
| (1) $2 NH_3 + H_2S \rightleftharpoons (NH_4)_2S$ | This is the initial formation of sulfide by sparging gas from a gas well containing at least 20% $H_2S$. |
| (2) $(NH_4)_2S + nS \longrightarrow (NH_4)_2S_{n+1}$ | This is the initial formation of higher polysulfide. It is a slow reaction but may be accelerated by the presence of surfactants. |
| (3) $(NH_4)_2S_{n+1} \xrightarrow{Excess\ H_2S} (NH_4)_2S_{m+1} + (n-m)S$ | The generation of lower polysulfide is accomplished by treatment of higher polysulfide with excess $H_2S$ to lower the pH, causing sulfur precipitation. |
| (4) $(NH_4)_2S_{m+1} + (n-m)S \longrightarrow (NH_4)_2S_{n+1}$ | The formation of higher polysulfide is accomplished in a rapid reaction by extraction of sulfur from the oil phase. |

A similar reaction sequence can be written for alkali sulfides. In a preferred embodiment, steps (3) and (4) are repeated, thus making it possible to continuously remove sulfur from oil without addition of fresh $NH_4OH$ solution. Since the surfactant is also reused for the most part, the only chemical consumption is the addition of surfactant makeup.

OPERATING RANGES FOR TEMPERATURES AND COMPOSITIONS IN FIG. 1

| | Temperature Ranges | Number of Phases | Oil Phase[1] | | | | Polysulfide Phase[2] | |
|---|---|---|---|---|---|---|---|---|
| | | | Oil | Free Sulfur[3] | Water | Cracking Agent | Poly-Sulfide | Water |
| Stream 1a | 100° to 250° F. | 2 | 90 to 60 | 0.2 to 0.6 | 10 to 40[7] | | | |
| Stream 2 | 60° to 100° F. | 1 | | | | 20 to 100[4] ppm | | |
| Stream 1b | 160° to 180° F. | 1 | 96 to 99 | 0.4 to 1.6 | 0.5 to 2[5] | 200 to 2000[5] ppm | | |
| Stream 3a[6] | 140° to 180° F. | 2[6] | 96 to 99 | 0.4 to 1.6 | 0.5 to 2[5] | 200 to 2000 ppm | 5 to 40 | 95 to 60 |
| Stream 4 | 60° to 140° F. | 1 | | | | | 5 to 40 | 95 to 60 |
| Stream 6 | 80° to 140° F. | 1 | — to — | 0.2 to 0.3 | 0.5 to 1[2] | 200 to 2000 ppm | | |
| Stream 7 | 80° to 140° F. | 1 | | | | | 9 to 70 | 91 to 30 |

[1]Weight based on oil.
[2]Weight percent based on polysulfide.
[3]Typically, oil may have 1.2% w total sulfur, half of which is elemental free sulfur and half molecularly bound. Over 50% of the free sulfur is removed per pass. The free sulfur is preferably maintained at less than 1% w, although the process of the invention equally is operable at higher sulfur levels, for example 1 to 5% free sulfur.
[4]Can be dissolved in aromatic solvent such as toluene or xylene to facilitate addition.
[5]Cracking agent dosage depends on specific agent used. The make up of agent is generally a small fraction of the level shown, as most of the agent remains functional even after being exposed to downhole conditions in a gas well.
[6]Oil/sulfide ratios of 3 to 20 can be used, 5 to 10 are preferred.
[7]This water (shown as 1c in FIG. 1) is first removed to leave 0.5 to 5% w water, but more typically 0.5 to 2% w water in stream 1b.

Among the alkali metals suitable for use in the present invention (lithium, sodium, potassium, rubidium, cesium), sodium is preferred. The principal operational differences between the ammonium polysulfide and the sodium polysulfide systems are due to facts that (a) the ammonium polysulfide system exhibits considerably higher vapor pressure than the sodium polysulfide system principally due to higher $H_2S$ partial pressures, and (b) the ammonium polysulfide solutions are less dense (or lighter) than the oil phases, whereas the sodium polysulfide solutions are heavier.

As above noted, the ability of alkali metal or ammonium sulfide solutions to extract sulfur is due to the formation of polysulfides. Similarly, the extraction by The oil phase/aqueous polysulfide phase ratio can vary from 2 to 20, the optimal ratio depending on concentration and capacity of the aqueous phase for sulfur, and on the amount of sulfur which must be extracted.

It would appear that more sulfur would be removed from the oil by reactions producing polysulfide from the sulfide as disclosed in U.S. Pat. No. 3,474,028. However, in a regenerative process there is no consumption of extractant, and thus the extent of desulfurization and rate of reaction are the overriding considerations. Although a somewhat larger volume of lower polysulfide may be required, than of sulfide, this effect is minimized by the fact that high oil/aqueous ratios are used, mostly over 5. On the other hand, the rates of extraction are important, particularly in static mixer extractions in which contact times of less than one minute are often employed.

The rates of extraction at equal oil/aqueous ratios are shown in the following examples:

EXAMPLE 1—Extractions with Sodium Sulfide Systems

Contact time 1 minute followed by rapid phase separation by centrifugation.

Aqueous phase: 20% $Na_2S$ solution with or without sulfur.

2000 ppm oil soluble surfactant.

| Oil/Aqueous Phase Ratio | % w Free Sulfur | | | | Rate of S-Removal % w Aqueous Phase/min |
|---|---|---|---|---|---|
| | Oil Phase | | Aqueous Phase | | |
| | Initial | Final | Initial | Final | |
| 5 | 1.5 | 0.9 | 0 | 11.3 | 3 |
| 5 | 1.5 | 0.3 | 5 | 11 | 6 |
| 10 | 1.5 | 1.0 | 0 | 5 | 5 |
| 10 | 1.5 | 0.4 | 5 | 16 | 11 |

At both ratios the lower polysulfide extracted more sulfur during the 1 minute of contact than the sulfur-free alkali sulfide system.

EXAMPLE 2—Extractions with Ammonium Sulfide Systems

Contact time: 1 minute, followed by rapid phase separation by centrifugation.

Aqueous phase: 20% w $(NH_4)_2S$ with or without sulfur 2000 ppm oil soluble surfactant

| Oil/Aqueous Phase Ratio | % w Free Sulfur | | | | Rate of S-Removal % w S-Aqueous/min |
|---|---|---|---|---|---|
| | Oil Phase | | Aqueous Phase | | |
| | Initial | Final | Initial | Final | |
| 5 | 1.5 | 0.7 | 9 | 4 | 4 |
| 5 | 1.5 | 0.2 | 5 | 11.5 | 6.5 |
| 10 | 1.5 | 0.9 | 0 | 6 | 6 |
| 10 | 1.5 | 0.3 | 5 | 17 | 12 |

As in Example 1, the lower polysulfide solution extracted more sulfur during a 1 minute contact than the sulfur-free sulfide, even though the latter may have ultimately a higher capacity for sulfur extraction.

The sulfide regeneration process of the present invention minimizes the dependence on caustic or ammonia supply and eliminates the disposal problem associated with the regeneration process. The sulfur-rich sulfide solution is treated with excess $H_2S$ gas until the pH is reduced to 8 from a pH of 12 to 13 for the alkali system or a pH of 9.5 to 10 for the ammonia system. This entails absorption of 2 to 4% w $H_2S$, the exact amount depending on the initial $NaOH/H_2S$ ratio, or $NH_3/H_2S$ ratio. At the low pH region the capacity of the solution for elemental sulfur is decreased, and a significant portion of the sulfur is precipitated. After removal of the precipitated sulfur, the excess $H_2S$ is removed by decompression and/or heating. The original high pH value is thus restored, and the solution is used to extract sulfur again, having been converted once again to the lower polysulfide form.

A schematic of one sulfide regeneration process is shown in FIG. 3. A higher polysulfide stream 30, such as stream 7 in FIG. 1, is passed into a regenerator 31. $H_2S$ stream 32 along with recycle $H_2S$ stream 33 is passed to the regenerator. Precipitated sulfur stream 34 is withdrawn from the regenerator. Stream 35 is passed to a degasser 36, from which recycle $H_2S$ stream 33 and lower polysulfide stream 37, which corresponds to stream 4 of FIG. 1, are taken.

EXAMPLE 3—Regeneration of Sodium Hydrosulfide System by Absorption of $H_2S$ at Atmospheric Pressure A sodium hydrosulfide solution containing 5% w of alkali hydrosulfide at a 2 moles $NaOH$/mole of $H_2S$ ratio was used to extract 3.95% w elemental sulfur. To this solution $H_2S$ was sorbed at atmospheric pressure until 2.5% w $H_2S$ was absorbed. The pH was thus reduced to 7.9. Approximately 70% of the sulfur was precipitated and removed by filtration.

The solution was then heated and decompressed until the pH value went up to 11.7. The solution at this point contained 4.5% w $H_2S$ by analysis. This solution was used to extract more sulfur from an oil phase containing 1.5% w free sulfur at an oil/aqueous phase ratio of 5.0. The sulfur level was reduced to 0.7% w free sulfur, a 54% reduction. The uptake of sulfur by the aqueous lower polysulfide was again ~4% w S as during the first extraction.

EXAMPLE 4—Regeneration of Sodium Hydrosulfide by Absorption of $H_2S$ at Positive Pressure An approximately 5% w $2NaOH/1$ $H_2S$ solution solution, pH 12.85, was used to extract 6.8% w elemental sulfur. The resulting high polysulfide was then heated with $H_2S$ at 20 psig and at 30 psig. The results obtained were as follows:

| $H_2S$ Psig | $H_2S$ Sorbed | pH | % S Precipitated | Wt $H_2S$ Sorbed Wt S Precipitated |
|---|---|---|---|---|
| 20 | 3% w | 8.4 | 58.6 | 0.9 |
| 30 | 3.4% w | 8.3 | 70.5 | 1.4 |

The polysulfide here varied from $Na_2S_{4.4}$ to $Na_2S_2$.

EXAMPLE 5—Regeneration of Ammonium Sulfide Solution by $H_2S$ Sorption

An ammonium polysulfide solution containing 6% w sulfur at pH 9.5 was treated with $H_2S$ until it absorbed 3.8% w $H_2S$ in a closed system. At this point the pH was reduced to 7.9, and about 4% w sulfur (i.e., 60% of the sulfur present) was precipitated and recovered by filtration.

Another method of regeneration of ammonium sulfide involves removing the volatile, active components, $NH_3$ and $H_2S$ through distillation.

EXAMPLE 6—Regeneration of Ammonium Sulfide Solution by Distillation

A 20% w $(NH_4)_2$ solution containing 14.5% w sulfur was distilled at 212° F. under a $N_2$ purge. The pH initially was 9.9. After distillation of 60% of the $H_2S$ and 70% of the $NH_3$, the pH was reduced to 7.9. At this point over 90% of the sulfur precipitated and was recovered. The aqueous phase remaining after filtration was clear, in sharp contrast to the initially dark-colored, sulfur-rich ammonium polysulfide.

In a process using the regeneration method of Example 6, the NH$_3$ and H$_2$S obtained by volatilization would be used to reconstitute the extracting solution.

Figure 4:
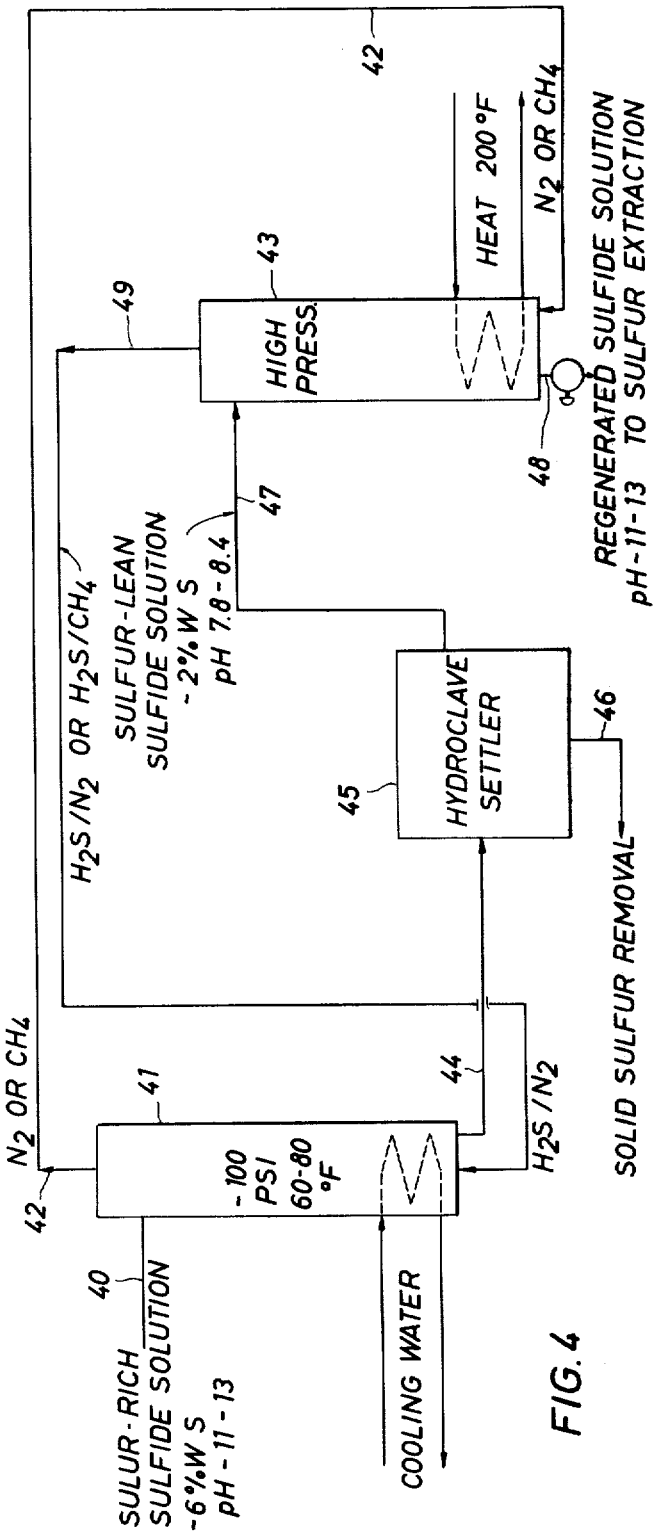

Regeneration by distillation is schematically shown in FIG. 4. Stream 40 of sulfur-rich sulfide solution of ~6% w sulfur at a pH of ~11–13 is admitted to distillation column 41 at a pressure of ~100 psi and temperature of 60°–80° F. Stream 42 of N$_2$ or CH$_4$ is taken overhead to high pressure distillation column 43 which is at a temperature of 200° F. to 240° F. Bottoms stream 44 from column 41 is sent to a hydroclave settler 45 from which a 60 Homs stream 46 of solid sulfur is removed. Stream 47 of sulfur-lean sulfide solution at ~2% w sulfur and a pH of 7.8–8.4 is sent to column 43. From column 43 is removed a bottoms stream 48 of regenerated sulfide solution of pH ~11–13 and an overhead stream 49 of H$_2$S/N$_2$ or H$_2$S/CH$_4$.

These and other tests show that depending on the solution composition, initial sulfur content, temperature and pressure, 1 lb of H$_2$S sorption leads to over 1 lb of sulfur precipitation. Although the H$_2$S used does not have to be pure, and treatment with CO$_2$/H$_2$S mixtures have also resulted in precipitation of sulfur, it is best, for a plant application, to use pure H$_2$S for this purpose. Such H$_2$S can be obtained most conveniently by degassing a regenerated sulfide solution (see FIG. 2).

Although any of the methods described in Examples 3–5 can be used to produce a lower polysulfide from a higher polysulfide, the advantages of rapid extraction by the lower polysulfide can also be obtained by using even an essentially non-regenerative mode of operation. To do this, it is only necessary to recycle a small part of the saturated, spent, higher polysulfide solution back to the process for admixture with fresh alkali or ammonium hydrosulfide. The higher polysulfide upon admixture with the fresh hydrosulfide re-equilibrates to yield lower polysulfide with high extraction rate capabilities.

What is claimed is:

1. A process for extracting sulfur from a mineral oil-sulfur solution wherein the mineral oil is at least partly in the form of an emulsion with a minor quantity of water comprising treating said solution by adding an oil/water emulsion-breaking surfactant thereto, contacting the treated solution with an aqueous solution of a lower polysulfide of an alkali metal or ammonia to form a higher polysulfide of said alkali metal or ammonia, and separating the mineral oil from the higher polysulfide.

2. The process of claim 1 wherein the lower polysulfide is Na$_2$S$_x$ wherein x ranges from about 1½ to 2½, and the higher polysulfide is Na$_2$S$_y$ wherein y ranges from about 4½ to about 6.

3. The process of claim 1 wherein the lower polysulfide is (NH$_4$)$_2$S$_m$ wherein m ranges from about 1½ to about 2½, and the higher polysulfide is (NH$_4$)$_2$S$_n$ wherein n ranges from about 4½ to about 6.

4. The process of claim 1 wherein the mineral oil is also at least partly in the form of an emulsion with the aqueous polysulfide, and the oil/aqueous polysulfide emulsion is broken by said surfactant.

5. The process of claim 4 wherein the surfactant comprises oil soluble, anionic, cationic or neutral telomers of propylene oxide or ethylene oxide, singly or in mixture.

6. The process of claim 1 wherein the lower polysulfide is regenerated from the higher polysulfide by distilling the higher polysulfide with either N$_2$ or CH$_4$.

7. A process for extracting sulfur from a mineral oil-sulfur solution comprising forming the solution by circulating the oil to remove sulfur deposits from a riser in a natural gas well, the oil having a viscosity lower than 200 centistokes at 122° F., and lower than 20 centistokes at 212° F., contacting said solution with an aqueous solution of a lower polysulfide of an alkali metal or ammonia to form a higher polysulfide of said alkali metal or ammonia, and separating the mineral oil from the higher polysulfide.

8. The process of claim 7 wherein the oil is a circulating oil used in a sour gas well to recover sulfur and is in the form of an emulsion with a minor amount of water, and the emulsion is broken with a surfactant which remains in the circulating oil.

9. A process for extracting sulfur from a mineral oil-sulfur solution comprising contacting said solution with an aqueous solution of a lower polysulfide of an alkali metal or ammonia to form a higher polysulfide of said alkali metal or ammonia, separating the mineral oil from the higher polysulfide and regenerating the lower polysulfide from the higher polysulfide by absorption of H$_2$S, thereby reducing the pH of the polysulfide and causing precipitation of sulfur.

10. A process for extracting sulfur from a mineral oil-sulfur solution comprising contacting said solution with an aqueous solution of a lower polysulfide of an alkali metal or ammonia to form a higher polysulfide of said alkali metal or ammonia, separating the mineral oil from the higher polysulfide and producing the lower polysulfide by recycling the higher polysulfide to be admixed with hydrosulfide produced by passing sour gas containing at least 20% v H$_2$S through an alkali hydroxide solution.

11. A countercurrent process for extracting sulfur from a mineral oil-sulfur solution comprising contacting the solution with an aqueous solution of a lower polysulfide of an alkali metal or ammonia to form a higher polysulfide of said alkali metal or ammonia, separating the mineral oil and remaining sulfur from the higher polysulfide, then contacting the mineral oil and remaining sulfur with a hydrosulfide to form a lower polysulfide, separating the mineral oil from the lower polysulfide, and recycling the lower polysulfide to be contacted with the mineral oil-sulfur solution.

12. The process of claim 11 wherein the hydrosulfide is produced by passing sour gas through alkali hydroxide solution.

13. The process of claim 11 wherein the hydrosulfide is regenerated from the higher polysulfide.

14. The process of claim 11 wherein the mineral oil-sulfur solution is at least partly in the form of an emulsion with a minor quantity of water and an oil/water emulsion breaking surfactant is added thereto.

15. The process of claim 14 wherein the mineral oil at least partly forms an emulsion with the aqueous higher polysulfide, and the oil/aqueous higher polysulfide emulsion is broken by said surfactant.

16. The process of claim 15 wherein the surfactant comprises oil soluble, anionic, cationic or neutral telomers of propylene oxide or ethylene oxide, singly or in mixture.

* * * * *